United States Patent [19]

Esna-Ashari et al.

[11] Patent Number: 4,960,461
[45] Date of Patent: Oct. 2, 1990

[54] METHOD AND INSTALLATION FOR EXTRACTING GOLD FROM GOLD ORE

[75] Inventors: Mohammed Esna-Ashari, Bergisch-Gladbach; Hans Kellerwessel, Aachen; Ludwig Gemmer; Gert-Helge Hamacher, both of Köln, all of Fed. Rep. of Germany

[73] Assignee: Klockner-Humboldt-Deutz AG, Fed. Rep. of Germany

[21] Appl. No.: 263,786

[22] Filed: Oct. 27, 1988

[30] Foreign Application Priority Data

Oct. 27, 1987 [DE] Fed. Rep. of Germany ....... 3736243

[51] Int. Cl.$^5$ .................. C22B 11/08; C22B 1/24; C01G 7/00
[52] U.S. Cl. .................................. 423/27; 75/747; 423/DIG. 15; 423/29; 266/137; 23/313 R; 241/3
[58] Field of Search ............ 266/168, 137; 423/27, 423/29, DIG. 15, 30; 75/118 R, 3, 105; 23/313 R; 241/3

[56] References Cited

U.S. PATENT DOCUMENTS

| 588,476 | 8/1897 | Rhodes | 423/27 |
| 1,342,917 | 6/1920 | Lane | 266/137 |
| 3,420,453 | 1/1969 | Tada et al. | 241/15 |
| 4,256,706 | 3/1981 | Heinen et al. | 423/29 |
| 4,357,287 | 11/1982 | Schonert | 264/82 |
| 4,374,097 | 2/1983 | Holland | 423/22 |

FOREIGN PATENT DOCUMENTS 3704140 8/1988 Fed. Rep. of Germany ...... 266/137

Primary Examiner—Robert L. Stoll
Assistant Examiner—Steven J. Bos
Attorney, Agent, or Firm—Hill, Van Santen, Steadman & Simpson

[57] ABSTRACT

The invention relates to a method and apparatus for extracting gold from gold ore. The apparatus and process save capital and operating costs in the extracting of gold from gold ore and include comminution and leaching of the ore, and more particularly the apparatus and process reduce the costs for the ore grinding, and make a fine ore grinding superfluous without having to accept a reduction in the gold yield during leaching. The gold ore is subjected to a product bed stressing and interparticle crushing in the nip of a high-pressure roller press before being leached and the product that has been product-bed-comminuted and subjected to interparticle crushing and the product agglomerates thereby formed are piled on a heap that is sprayed with a lixivium.

9 Claims, 1 Drawing Sheet

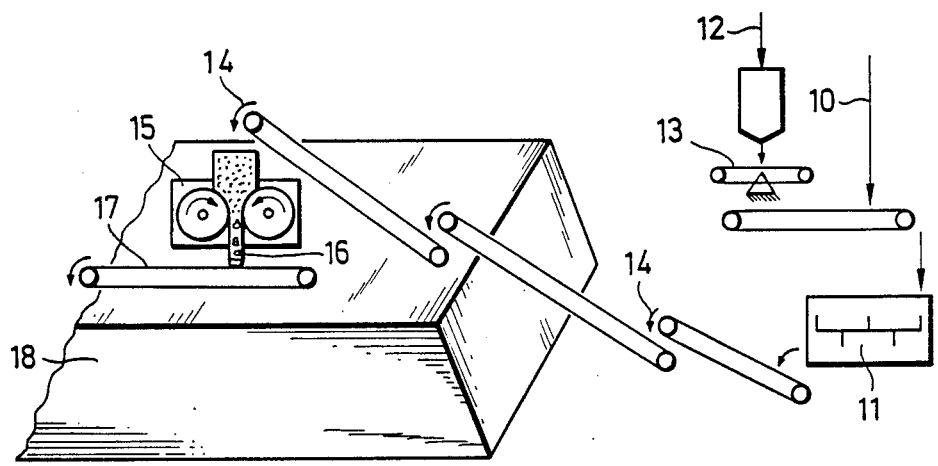

METHOD AND INSTALLATION FOR EXTRACTING GOLD FROM GOLD ORE

BACKGROUND OF THE INVENTION

The invention is directed to a method and apparatus for extracting gold from gold ore by comminution, agglomeration and leaching of the ore.

Metallic gold is usually extracted from gold ores by leaching the ore, for example with a cyanide solution, and subsequent recovery from the solution by precipitation or adsorption. Standard methods for leaching are what are referred to as agitator leaching or bulk leaching. A trickle leaching in basins is also occasionally employed. The present invention is directed to the processing of the ore for bulk leaching and can also be employed for basin leaching.

A number of prerequisites are needed so that the lixivium sprinkled on the ore pile can optimally dissolve the gold to a great extent:

1. The ore must be comminuted to such an extent until nearly all elemental gold particles enclosed therein are opened up, i.e. every gold particle must have a part of its surface tangential with the surface of the ore particle. It would also suffice if the ore particle were permeated such as by micro-cracks so that the lixivium can penetrate into the interior of the ore particle and dissolve the elemental gold situated there. This effect, however, cannot occur with a conventional ore comminution.
2. The ore charge must be adequately permeable for the lixivium in and of itself so that the lixivium can reach all ore particles. The permeability within the ore pile must be uniform, otherwise, the lixivium will seek paths of least resistance and a part of the ore will not be leached. For example, having the leach rinse superfine grains from the upper portions of the pile between coarser particles cannot occur, and the superfine grains collecting in the lower region and seal this region like a clay layer.
3. Finally, an adequate volume of air-filled pores is also needed in the ore batch because the cyanidic lixivium requires the presence of oxygen.

In order to satisfy these prerequisites, it is standard to first comminute (for example, to less than 20 mm) the ore for the purpose of digestion and to then granulate it upon addition of some bonding agent, for example cement, by means of a rolling ore make-up granulation, usually granulating drums. The required porosity of the charge for lixivium passage and for air access is thus achieved. The superfine grain contained in this crushed ore is also bonded and cannot be rinsed out.

The ore particles, however, are now bonded in the granules. When these are too dense, then the access of the lixivium to the ore particles is made more difficult. When relatively porous granules are produced, the lixivium can in fact penetrate but the strength of the granules is low and there is the risk that the granules will be compressed by the load of the layers situated thereabove, and the porosity of the individual granules as well as the charge as a whole is lost.

Optimum conditions, consequently, can only be achieved with difficulty. Moreover, the overall process for the processing the ore for the subsequent leaching, involves the method steps of comminution, dosing with the bonding agent, mixing and rolling granulation.

It is an object of the invention to obtain a method and apparatus in extracting gold from gold ore comprising comminution and leaching of the ore which will save capital and operating costs, particularly to reduce the costs for the ore grinding without having to accept a decrease in the gold yield.

A further object of the invention is to provide an improved method and apparatus for the extraction of gold from ore particles which obtains an improved and more uniform extraction providing improvements over methods and apparatus heretofore available.

A further object of the invention is to provide a process and apparatus for use in extracting gold from gold ore wherein the ore is initially subjected to interparticle crushing and the ore thereby yields itself to improved treatment by leaching.

FEATURES OF THE INVENTION

In the inventive treatment in the nip of the high-pressure roller press, the input gold ore is simultaneously comminuted and agglomerated to form what are referred to as "scabs". The formation of agglomerate occurring in the product bed comminution is desirable in this case. The strength of the scabs that can be layered to form a pile for the purpose of bulk leaching depends on the properties of the charging stock and on the operating parameters of the roller press. After the comminution of the ore with the roller press, the ore particles are permeated by micro-cracks. As a result thereof, the lixivium can also penetrate to gold particles enclosed in the inside of the ore particles. A less far-reaching comminution is therefore needed for digesting the gold particles than given conventional comminution wherein the gold ore, for example, is ground in ball mills in an energy-intensive manner in order to be subsequently shaped into pellets, for example.

A particular feature of the improvement occurs wherein the ore is subjected to the initial treatment in a press which creates interparticle crushing. This crushing is more than merely passing the ore through a roller mill but involves subjecting the ore to pressure in the nip between rolls which have a unique nip width and high pressure to the extent to create what is known as interparticle crushing and wherein the particles in the nip crush each other and generate micro-cracks in the ore particles so that the leaching liquid uniquely penetrates these micro-cracks. In the interparticle crushing, the gold ore is agglomerated with the particles in the agglomeration having the micro-cracks.

The inventively formed agglomerates have a porosity of 10 through 30 volume percent. The lixivium can thus penetrate well into the ore particles from the outside of the agglomerates because of the result of the interparticle crushing. The flag-like scabs, about 10 through 30 mm thick, can be easily divided into fragments having edge lengths of about 30 through 90 mm. These have a desirable shape for the formation of a permeable pile. With flags having a greater ratio of edge length to thickness, there would be the risk that these would lie on top of one another "flag on flag" and would deliver a fill having lower porosity with larger pieces, the path of the lixivium into the inside of the agglomerates would be too long and would require an extremely long leaching time with a greater proportion of superfine material, the porosity of the bulk fill would be too low.

In many cases, the scabs disintegrate into fragments of appropriate size when leaving the roller press, particularly when the rollers are provided with "chevron"-shaped profilings welded on in a known manner whose spacing is appropriately selected. In the case of particularly solid scabs, these can be divided with a small spiked roller crusher. The spiked roller crusher can be structurally integrated in the roller press. A separate comminution machine for dividing the scabs is thus not required.

Tests have shown that, dependent on the properties of the raw ore and on the selected operating parameters, the strength of the scabs is adequate for the bulk leaching on a case-by-case basis even without an addition of a bonding agent. In other cases, the addition of a bonding agent is necessary for an adequate strength; however, the bonding agent can be added to the gold ore before the treatment with the roller press. Comminution and granulation occur in one procedure. A work cycle is thus eliminated as compared to the conventional method.

Charging stock can be processed without difficulty in the roller press. Valid as a rule of thumb is that the water content expressed in volume percent cannot be higher than the porosity of the scabs produced (dependent on the density of the solid, this is about 4 through 6% of the mass). When the moisture of the raw ore is lower, then there is the possibility of adding additional liquid preceding the roller press.

It has also been found that it is expedient to add a subquantity of the lixivium to the ore preceding the roller press. With maximum pressures on the order of magnitude of 50 through 200 MPa occurring in the product bed in the nip, this portion of the lixivium is immediately brought into extremely intimate contact with the newly created surfaces, both with the new fracture faces of the ore particles as well as with the "inner" surfaces of the micro-cracks that have formed by the interparticle crushing. The new surfaces are especially reactive "in statu nascendi". The rate of dissolving is thus promoted. The method thus becomes more economical since the operating costs are all the lower the greater the power of a given installation. In particular, the costs of bulk leaching are influenced by the percentages gain for the raw ore conveyed and, thus, the raw ore is burdened by the required conveying costs until the conclusion of the leaching. A shortening of the leaching time consequently results in a corresponding reduction in the operating costs.

In the inventive extracting of gold from gold ore, energy costs, wear costs and capital costs are saved for the following reasons. The gold ore need not be as finely ground as hitherto. That is, high gold yields are achieved on the basis of the pretreatment of the ore in the high pressure roller press without having to finely grind the ore. Also, fine-grinding machines such as ball mills become superfluous. Given the same grinding fineness, the roller press is more beneficial in terms of wear and energy consumption. Due to the pre-treatment of the gold ore in the high-pressure roller press before the leaching, the leaching time is considerably reduced in comparison to that in conventional comminution with the same gold yield, and as a result of the comparatively short leaching time, capital costs can be eliminated or the capacity of an existing system can be increased.

This inventive combination occurs where comminution and agglomeration happen in one machine. The machine does not contain any reciprocating machine parts, runs very smoothly and therefore requires no foundations for absorbing horizontal forces, and enables the entire apparatus to be arranged above the ore pile as shown in the drawing. Destruction of the agglomerates during conveying is thereby avoided.

The following numerical example serves the purpose of explaining the advantages of the method of the invention. The bulk leaching was simulated in the laboratory by leaching in columns of plexiglass having a diameter of 200 mm on which a sodium cyanide solution (0.5 g sodium cyanide per liter) was dripped in circulation with a metering pump, a preliminary leaching container and an absorption bottle containing activated carbon. The proportion of gold leached out was identified by analysis of the activated carbon dependent on the leaching time.

The process could be visually observed in the plexiglass columns. A gold ore having a content of 4.48 g/t served as charging stock, this having been pre-processed in a different way, namely (a) conventional comminution to less than 20 mm, rolling granulation after addition of 1% portland cement and 3% water;

(b) inventive comminution and agglomeration following prior addition of 3% water in the high pressure roller press with a relative pressing power of 44 kN per cm of scab width referred to 1 m roller diameter without a bonding agent additive;

(c) inventive comminution and agglomeration in the high-pressure roller press following prior addition of 1% portland cement and 3% water, whereby a relative pressing power of 43 kN per cm of scab width was established.

A filter layer of sand having a grain size of 2 through 3 mm was arranged under the ore to a height of about 100 mm in every case. The further test data are complied in the following table.

| Type of treatment | (a) Conventional | (b) Roller press With Cement | (c) Roller press Without Cement |
|---|---|---|---|
| Raw ore sample in kg (dry matter) | 70.0 | 61.4 | 62.2 |
| Volume of the fill at the beginning of the test in liters | 50.8 | 44.0 | 45.2 |
| Volume of the fill after establishing an equilibrium | 50.2 | 43.7 | 39.6 |
| Porosity of the fill after setting the equilibrium in volume percent | 49.1 | 48.7 | 42.7 |
| Slurrying of superfine grains | none observed | none observed | none observed |
| Leaching rate in the first 168 hours mg of Au leached out per 100 kg of raw ore batch and per hour | 1.24 | 1.71 | 1.87 |

It can be seen from the results that the inventive pretreatment of the gold ore with the roller press both with and without cement additive (bonding agent) supplies a fill of ore agglomerate having adequate stability and porosity and that the leaching rate for the ore treated with the roller press is noticeably higher.

Other objects, advantages and features will become more apparent with the teaching of the principles of the invention in connection with the disclosure of the preferred embodiments thereof in the specification, claims and drawings, in which:

DESCRIPTION OF THE DRAWING

The single FIGURE of the drawing is a somewhat diagrammatic view shown partially in perspective view of an apparatus operating in accordance with the principles of the present invention.

DESCRIPTION OF THE PREFERRED EMBODIMENTS

The drawing shows the flow chart of extracting of gold from gold ore comprising comminution and cyanidic leaching of the ore in accordance with the invention. Raw gold ore 10 precomminuted to a grain size below 70 mm and having a gold content of, for example, 4 g/t Au is introduced into a mixer 11 in which one or more bonding agents 12 such as, for example, cement and water, are added in metered fashion via metering equipment 13. The mixture 14 of gold ore and bonding agent is subjected to a product bed comminution or product bed stressing, or in other words interparticle crushing, in the nip of a high-pressure roller press 15 whose drum diameter is on the order of 1 m, being subjected upon application of a high roller pressing power of at least 30 kN/cm of roller width, whereby what are referred to as scabs 16 are formed, these being capable of being piled, for example, to pellets to form a high pile 18 of a height of 6 meters via a reversible conveyor belt 17.

The high pressure roller press 15 in order to attain the interparticle crushing which prepares the gold ore, has a roller with a diameter of more than 750 mm. The lower limit of the roll pressing power is 0.5 t/cm of roller length.

Expediently, the roller press 15 is arranged directly above the pile 18 to be heaped up. A solution containing sodium cyanide is sprayed onto the pile 18 by a sprinkler system above the pile 18. The gold-containing solution that trickles down is collected and is supplied for further use, namely for extracting gold from the solution by gold adsorption at, for example, activated carbon.

The gold ore pre-treated according to the invention in the high-pressure roller press 15 exhibits a significantly better leaching behavior than does conventionally comminuted ore. The product bed treatment in the roller press 15 achieves high gold yields of above 96%. In order to obtain the same high yield, the ore would have to be conventionally comminuted to below 0.125 mm in an energy-consuming manner.

The reasons for the favorable leaching behavior of the ore pre-treated with the high-pressure roller press 15 can be essentially seen in that the material is not only finely comminuted by the pressure treatment in the product bed stressing but micro-cracks also appear in addition to normal cracks due to interparticle crushing. The cyanidic solution can therefore penetrate into the incipient grain cracks and can dissolve the gold. Microscopic investigations of the scabs 16 have confirmed this fact. Crack formations as well as super-fine hair-line cracks have appeared in the gangue of the ore. Moreover, the gold in the mineral is exposed due to the high-pressure treatment of the gold ore and is made easily accessible to the lixivium.

Gold yields of 95% and more can be obtained in cyanidic leaching where the gold ore is comminuted to a grain size below 1 mm in the product bed stressing of the invention. A fine grinding of the ore is thus not necessary. Because a relatively coarse material is leached in the invention, the subsequent solids/liquids parting can be more simply designed.

There is also the possibility of deagglomerating the scabs or agglomerates 16 of the high-pressure roller press 15 in a deagglomerator such as, for example, a hammer mill or in an agitator vessel by dispersion and to employ a cyanidic leaching by agitation instead of the bulk leaching shown in the drawing.

We claim as our invention:

1. A method for extracting gold from gold ore comprising the steps:

pressing the ore by subjecting the ore to pressure in a two roll press in excess of 0.5 tons per centimeter of nip length causing product bed stressing being of sufficiently high pressure to generate interparticle crushing and to create hair-line cracks in the ore particles and to agglomerate the ore into scabs in the pressing;

adding a bonding agent to the gold ore before subjecting the ore to product bed stressing and interparticle crushing;

and leaching the scabs as soon as they are formed with a gold leaching agent which penetrates the cracks formed by said product bed stressing and interparticle crushing so that all of the steps occur simultaneously.

2. A method of extracting gold from gold ore in accordance with the steps of claim 1:

including adding a small quantity of lixivium solvent to the gold ore before subjecting the ore to product bed stressing and interparticle crushing.

3. A method of extracting gold from gold ore in accordance with the steps of claim 1:

wherein the product bed stressing and interparticle crushing creates a porosity of 10% to 30% by volume.

4. A method of extracting gold from gold ore in accordance with the steps of claim 1:

wherein the product bed stressing and interparticle crushing creates scabs having a thickness in the range of 10 through 30 mm with edge lengths in the range of 30 through 90 mm.

5. A method of extracting gold from gold ore in accordance with the steps of claim 1:

wherein the product bed stressing and interparticle crushing creates scabs having a greater ratio of edge length to thickness.

6. A method of extracting gold from gold ore in accordance with the steps of claim 1:

wherein the maximum pressures in the nip for product bed stressing and interparticle crushing are in the range of 50 through 200 MPa.

7. A method of extracting gold from gold ore in accordance with the steps of claim 1:

including adding powdered cement as a bonding agent prior to the product bed stressing and interparticle crushing.

8. A method of extracting gold from gold ore in accordance with the steps of claim 1:

including pre-comminuting raw gold ore to a grain size below 70 mm prior to product bed stressing and interparticle crushing.

9. A method of extracting gold from gold ore in accordance with the steps of claim 1:

wherein the product bed stressing and interparticle crushing is accomplished with a crushing force in the nip in excess of 30 kN/cm of roller width.

* * * * *